(12) United States Patent
Son et al.

(10) Patent No.: US 11,667,243 B2
(45) Date of Patent: Jun. 6, 2023

(54) SHAKE PREVENTION STRUCTURE OF GLOVE BOX

(71) Applicant: HYUNDAI MOBIS CO., LTD., Seoul (KR)

(72) Inventors: Dong Il Son, Ulsan (KR); Dong Yong Choi, Gyeonggi-do (KR); O Sim Kwon, Ulsan (KR); Tae Yong Eom, Ulsan (KR); Sun Kyung Kim, Ulsan (KR); Chang Bok Park, Ulsan (KR); Young Ki Oh, Gyeonggi-do (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 16 days.

(21) Appl. No.: 17/387,280

(22) Filed: Jul. 28, 2021

(65) Prior Publication Data

US 2022/0032851 A1 Feb. 3, 2022

(30) Foreign Application Priority Data

Jul. 29, 2020 (KR) .................. 10-2020-0094735

(51) Int. Cl.
*B60R 7/06* (2006.01)
*E05B 83/30* (2014.01)

(52) U.S. Cl.
CPC .............. *B60R 7/06* (2013.01); *E05B 83/30* (2013.01)

(58) Field of Classification Search
CPC ..... B60R 7/06; B60R 7/04; B60R 2011/0005; B60R 2011/0084
USPC ............................................ 296/36.12, 37.12
See application file for complete search history.

(56) References Cited

U.S. PATENT DOCUMENTS

| 8,602,476 B2* | 12/2013 | Doll ................... B60R 7/06 312/330.1 |
| 9,914,398 B1* | 3/2018 | Sanders ............... B60R 7/06 |
| 10,486,607 B2* | 11/2019 | Harima ............... B60R 7/06 |
| 2007/0182188 A1* | 8/2007 | Penner ................ B60R 7/06 296/37.12 |
| 2017/0174140 A1 | 6/2017 | Peregrina Loera et al. |

FOREIGN PATENT DOCUMENTS

| DE | 202019105893 U1 | 12/2019 |
| JP | 2007331693 A | 12/2007 |
| KR | 100350274 B1 | 8/2002 |
| KR | 1020050096660 A | 10/2005 |
| KR | 100868151 B1 | 11/2008 |
| KR | 1020140113417 A | 9/2014 |
| KR | 102082171 B1 | 2/2020 |

* cited by examiner

*Primary Examiner* — Pinel E Romain
(74) *Attorney, Agent, or Firm* — Hauptman Ham, LLP

(57) ABSTRACT

A shake prevention structure of a glove box including a housing mounted to an instrument panel and a storage part provided in an inner space of the housing so as to be slidably withdrawn therefrom includes: a shake prevention part mounted to a rear portion of the storage part, and a guide groove allowing an end part of the shake prevention part in a longitudinal direction thereof to be inserted thereto and provided along a longitudinal direction of the housing.

4 Claims, 8 Drawing Sheets

[FIG. 1]
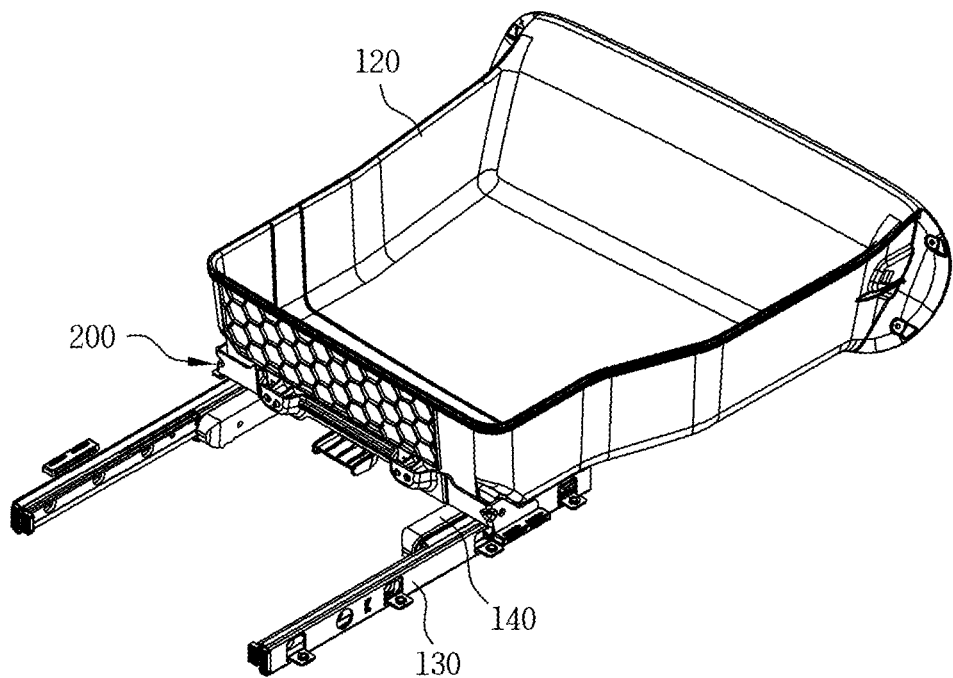

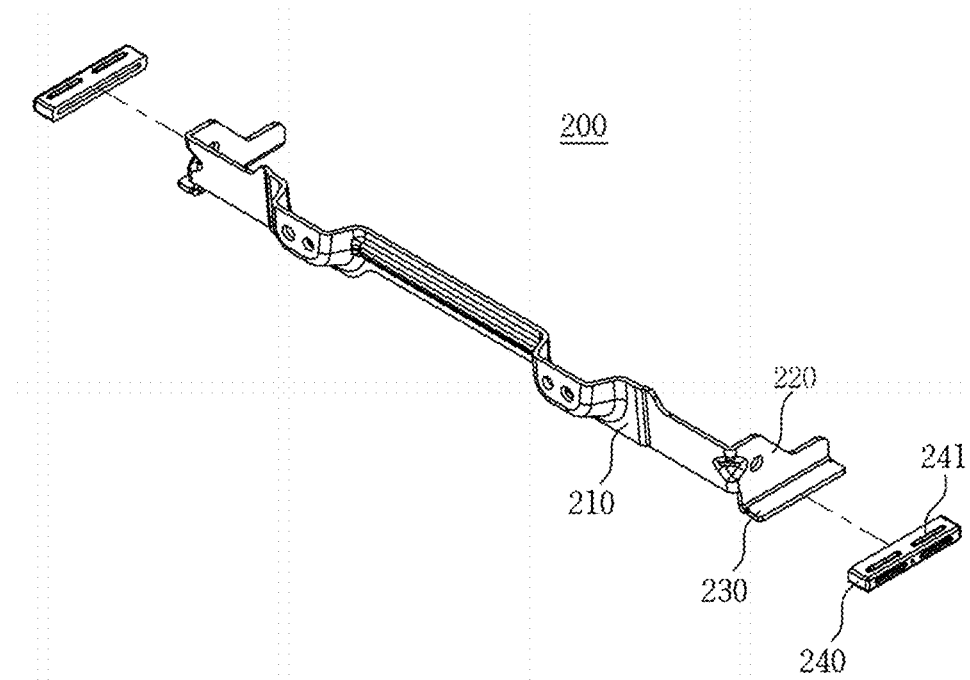
[FIG. 2]

[FIG. 3]
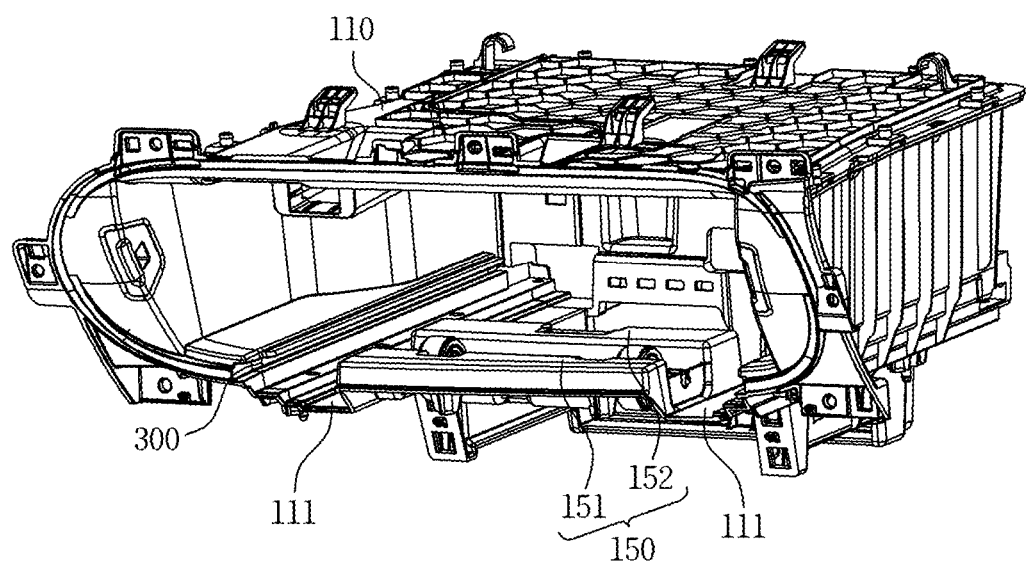

[FIG. 4]
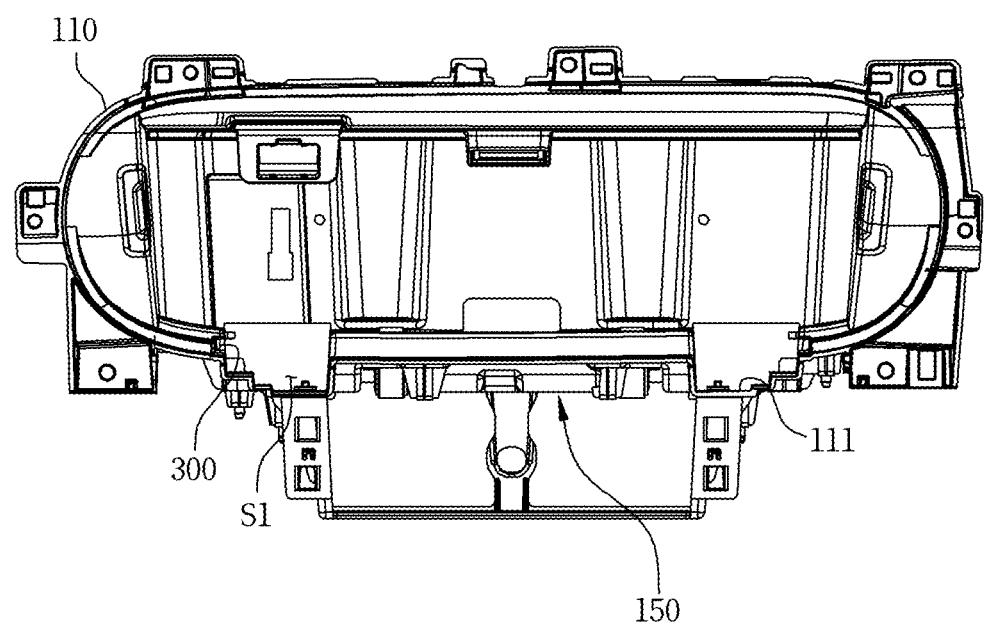

[FIG. 5]
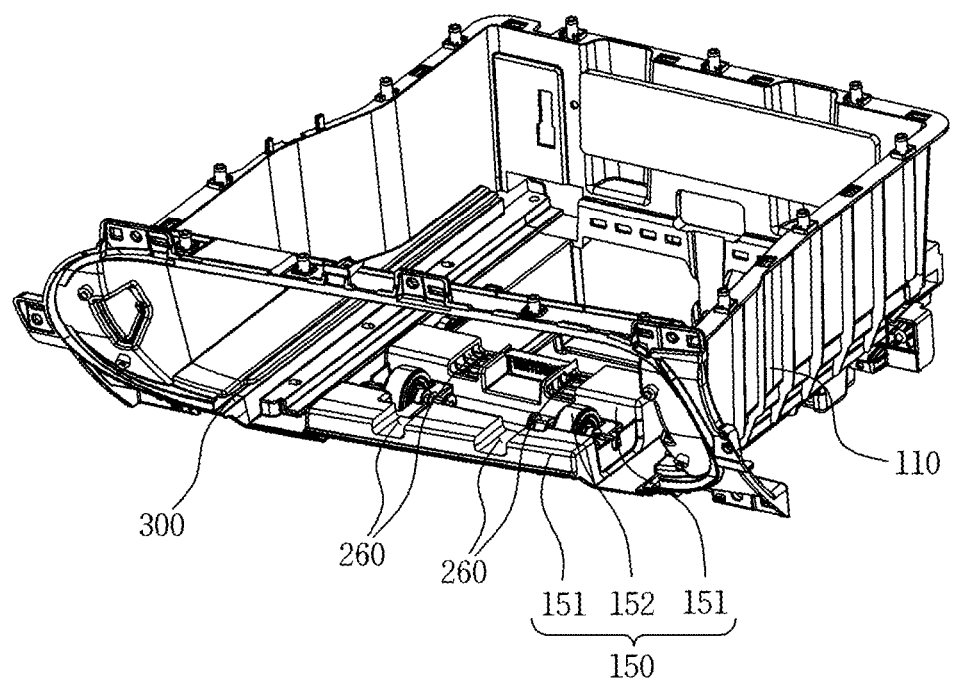

[FIG. 6]
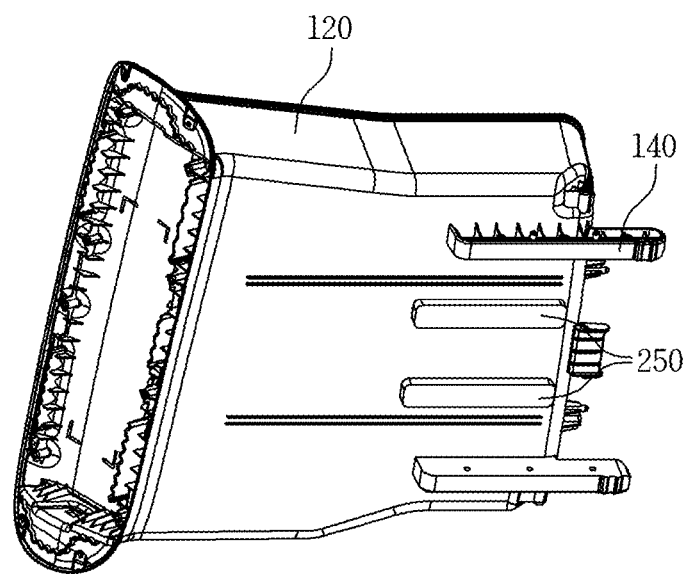

[FIG. 7]
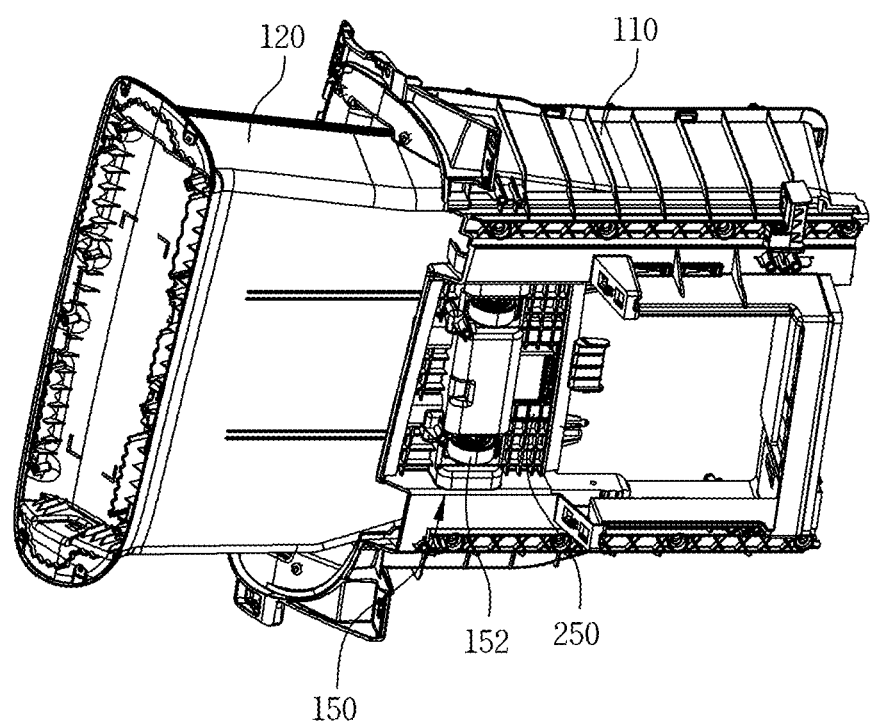

[FIG. 8]
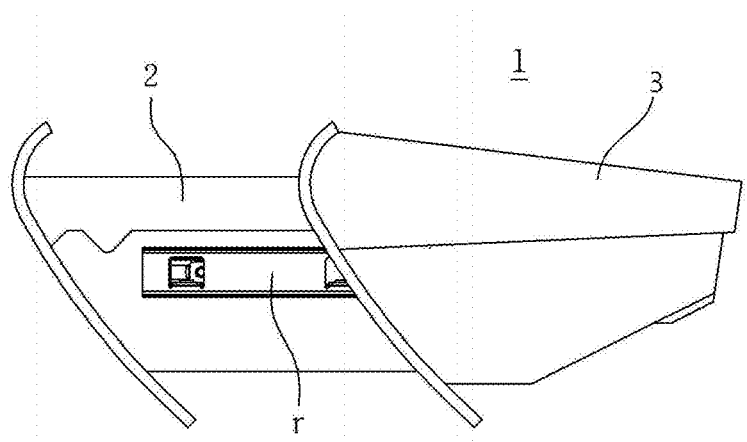

SHAKE PREVENTION STRUCTURE OF GLOVE BOX

CROSS REFERENCE TO RELATED APPLICATION

The present application claims priority to Korean Patent Application No. 10-2020-0094735, filed Jul. 29, 2020, the entire contents of which is incorporated herein for all purposes by this reference.

BACKGROUND OF THE INVENTION

Field of the Invention

The present disclosure relates generally to a shake prevention structure of a glove box. More particularly, the present disclosure relates to a shake prevention structure of a glove box which is configured to prevent the glove box from shaking in a width direction thereof when the glove box is rectilinearly reciprocated along a guide rail in an instrument panel.

Description of the Related Art

Generally, an instrument panel in which an indicator, an operation switch, and an audio system, etc. are installed is provided at a front portion inside a vehicle.

In addition, a glove box for storing goods used inside a vehicle is installed at a side of the instrument panel, that is, at a passenger side, such that the glove box can be opened and closed.

The glove box may largely include: a housing mounted to the instrument panel; a storage part provided in the housing; and a front panel mounted to a front portion of the storage part.

The storage part has space in which goods can be received, and may be opened and closed at the housing by rotating.

The front panel is a component mounted to a groove part formed in the front portion of the storage part, and has a handle which is gripped by a user.

Generally, in the glove box described above, the storage part is configured to be opened and closed at the housing mounted to the instrument panel by rotating.

However, recently, as the inner space of a vehicle has been expanded, a glove box configured to be opened and closed by rectilinearly reciprocating slidably in the instrument panel is being applied to a vehicle.

In the sliding type glove box, the storage part in the instrument panel is configured to be opened and closed by moving rectilinearly along a guide rail.

However, as illustrated in FIG. 5, in the existing sliding type glove box 1, when the storage part 2 is withdrawn from the housing 3 fixedly mounted to the instrument panel (not shown), the guide rail r is configured to move together with the storage part and is exposed to the outside, which causes an unattractive appearance.

In addition, in the existing sliding type glove box 1, to support the weight of the storage part, the guide rail r is provided at each of opposite sides of the storage part 2, so the inner space of the storage part 2 is reduced due to volume occupied by the guide rail r.

Accordingly, the present applicant has developed a glove box in which only the first-side bottom surface of the storage part in a longitudinal direction thereof is configured to be connected to rails such that the rails are not exposed to the outside when a storage part is withdrawn from the housing.

Accordingly, the glove box in which the rails are mounted to the bottom surface of the storage part has the advantage of maintaining the beauty of the inner space of a vehicle. However, when a user moves the storage part in a sliding method in the housing, the storage part has the problem that the storage part shakes in a width direction thereof. That is, since the guide rail is mounted only to the bottom portion of the storage part, the storage part is shaken in a horizontal direction when the storage part is rectilinearly reciprocated, which causes noise.

Accordingly, in order to solve the above problems, the present applicant has proposed the sliding type glove box of the present disclosure, and as a related prior art, "Operation device of electric sliding glove box for vehicle" is disclosed in Korean Patent No. 10-2082171.

SUMMARY OF THE INVENTION

Accordingly, the present disclosure has been made keeping in mind the above problems occurring in the related art, and the present disclosure is intended to propose a shake prevention structure of a glove box which prevents a storage part from shaking in a width direction thereof when the storage part is rectilinearly reciprocated in a housing.

In order to achieve the above objective, according to one aspect of the present disclosure, there is provided a shake prevention structure of a glove box including a housing mounted to an instrument panel and a storage part provided in an inner space of the housing so as to be slidably withdrawn therefrom, the structure including: a shake prevention part mounted to a rear portion of the storage part, and a guide groove allowing an end part of the shake prevention part in a longitudinal direction thereof to be inserted thereto and provided along a longitudinal direction of the housing.

In addition, the shake prevention part may include: a first frame coupled to a rear surface of the storage part; a second frame connected integrally with the first frame and coupled to a portion of a side surface of the storage part by bending at each of opposite ends of the first frame in a longitudinal direction thereof; and a third frame connected integrally with the second frame and protruding from a lower end of the second frame such that the third frame is inserted into the guide groove.

Furthermore, a rubber cap may be mounted to the third frame, and a removal prevention protrusion may be formed on an outer surface of the rubber cap.

Additionally, the structure may further include: a pair of outer rails arranged under the storage part, and inner rails having lengths shorter than lengths of the outer rails, the inner rails being provided to move along the outer rails, respectively, and connected to a first-side bottom surface of the storage part in a longitudinal direction thereof.

In addition, the structure may further include: a support part provided in the housing and supporting a bottom surface of the storage part, wherein the support part may include: a pair of support frames arranged in horizontal directions intersecting longitudinal directions of coupling frames of the housing in which each of the outer rails is seated and connected to the coupling frames, the support frames being provided by being spaced apart from each other and in surface contact with the bottom surface of the storage part; and rollers provided rotatably between the pair of support frames and in rolling contact with the bottom surface of the storage part.

In the shake prevention structure of a glove box according to the present disclosure, when the storage part is withdrawn from the housing or is moved to be received in the housing, the storage part is prevented from shaking in a width direction thereof by the shake prevention part and the guide groove in cooperation with each other, thereby reducing noise occurring due to the contact of the storage part with the housing and decreasing damage to the storage part or the housing.

In addition, in the shake prevention structure of a glove box according to the present disclosure, the support part is configured to support the first-side bottom surface of the storage part in a longitudinal direction thereof, which is withdrawn from the housing, thereby preventing a force supporting the weight of the storage part from being reduced.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a perspective view illustrating a rear portion of a storage part according to an embodiment of the present disclosure;

FIG. 2 is a perspective view of a shake prevention part according to the embodiment of the present disclosure;

FIG. 3 is a perspective view of a housing according to the embodiment of the present disclosure;

FIG. 4 is a front view of the housing according to the embodiment of the present disclosure;

FIG. 5 is a perspective view illustrating a state in which a guide groove is formed in a support part according to the embodiment of the present disclosure;

FIG. 6 is a perspective view illustrating a state in which a longitudinal protrusion is provided at a bottom portion of the storage part according to the embodiment of the present disclosure;

FIG. 7 is a perspective view illustrating a state in which the longitudinal protrusion is inserted to a slot, seen from below, when the storage part is withdrawn from the housing according to the embodiment of the present disclosure; and FIG. 8 is a view illustrating the configuration of a conventional glove box.

DETAILED DESCRIPTION OF THE INVENTION

Advantages and features of the present disclosure, and a method of achieving the advantages and features will become apparent with reference to an embodiment described later in detail with the accompanying drawings.

However, the present disclosure is not limited to the embodiment disclosed below, but may be implemented in various forms. The embodiment is provided to make the present disclosure complete, and to fully inform the scope of the present disclosure to those skilled in the art to which the present disclosure belongs, and the present disclosure is defined only by the scope of the claims.

Hereinafter, a shake prevention structure of a glove box according to the embodiment of the present disclosure will be described in detail with reference to FIGS. 1 to 7. In describing the sliding type glove box of the present disclosure, detailed descriptions of related known functions or configurations are omitted so as not to obscure the subject matter of the present disclosure.

FIG. 1 is a perspective view illustrating a rear portion of a storage part according to the embodiment of the present disclosure; FIG. 2 is a perspective view of a shake prevention part according to the embodiment of the present disclosure; FIG. 3 is a perspective view of a housing according to the embodiment of the present disclosure; FIG. 4 is a front view of the housing according to the embodiment of the present disclosure; FIG. 5 is a perspective view illustrating a state in which a guide groove is formed in a support part according to the embodiment of the present disclosure; FIG. 6 is a perspective view illustrating a state in which a longitudinal protrusion is provided at a bottom portion of the storage part according to the embodiment of the present disclosure; and FIG. 7 is a perspective view illustrating a state in which the longitudinal protrusion is inserted to a slot, seen from a lower portion of the housing, when the storage part is withdrawn from the housing according to the embodiment of the present disclosure.

As illustrated in FIGS. 1 to 4, the shake prevention structure 100 of a glove box according to the embodiment of the present disclosure may largely include the housing 110 mounted to an instrument panel and the storage part 120 provided in the inner space of the housing so as to be slidably withdrawn therefrom.

As described above, the housing 110 may be considered to be a component mounted to the instrument panel and, as illustrated in FIGS. 3 and 4, may have space in which the storage part 120 can be received.

As illustrated in FIG. 1, the storage part 120 may have a box shape having an open upper part and may be mounted in the inner space defined by the housing 110.

A pair of outer rails 130 fixedly mounted to the housing 110 may be arranged under the storage part 120.

Each of the outer rails 130 may be considered as a component mounted in the inner space defined by the housing 110, and may have a U-shaped cross section. For reference, in the embodiment of the present disclosure, the outer rail 130 is illustrated to be separated from the housing 110 such that the configuration of the outer rail 130 is easily grasped.

The outer rail 130 is provided as a pair of outer rails provided in the inner space of the housing 110 by being spaced apart from each other and may be arranged under each of the opposite sides of the storage part 120 in a width direction thereof.

In addition, inner rails 140 may be provided at the outer rails 130.

Each of the inner rails 140 has length shorter than the length of the outer rail 130 and is provided to move along the outer rail 130, and may be connected to the first-side bottom surface of the storage part 120 in the longitudinal direction thereof. Accordingly, the storage part 120 may be rectilinearly reciprocated along the longitudinal direction of the outer rail 130 by the movement of the inner rail 140.

For reference, when the inner rail 140 moves from a first side of the outer rail 130 in a longitudinal direction thereof to a second side thereof in the longitudinal direction, the storage part 120 may be moved such that a portion of a second side of the storage part 120 in the longitudinal direction thereof is exposed to the outside of the housing 110. Contrarily, when the inner rail 140 moves from the second side of the outer rail 130 in the longitudinal direction thereof to the first side in the longitudinal direction, the storage part 120 may be moved such that the storage part 120 is received in the housing 110.

In addition, as illustrated in FIGS. 1 and 2, the shake prevention structure of a glove box according to the embodiment of the present disclosure may include: the shake prevention part 200 mounted to a rear portion of the storage part 120, and the guide groove 300 allowing an end part of the shake prevention part 200 in a longitudinal direction thereof to be inserted thereto and provided along the longitudinal direction of the housing 110.

As illustrated in FIG. 2, the shake prevention part 200 may include: a first frame 210 coupled to a rear surface of the storage part 120; a second frame 220 connected integrally with the first frame 210 and coupled to a portion of a side surface of the storage part 120 by bending at each of opposite ends of the first frame 210 in a longitudinal direction thereof; and a third frame 230 connected integrally with the second frame 220 and protruding from a lower end of the second frame 220 such that the third frame 230 is inserted into the guide groove 300.

The first frame 210 may be considered as a component mounted to the rear surface of the storage part 120, and may be arranged along the entirety of the longitudinal direction of the rear surface of the storage part 120.

The second frame 220 is a component connected integrally with the first frame 210, and as described above, may be coupled to the portion of the side surface of the storage part 120 by bending toward a front surface of the storage part 120 at each of the opposite ends of the first frame 210 in the longitudinal direction thereof.

The third frame 230 is a component connected integrally with the second frame 220, and as described above, protrudes in the forming direction of the guide groove 300 at the lower end of the second frame 220 such that the third frame 230 is inserted into the guide groove 300. That is, the third frame 230 may be formed by protruding in a direction parallel to the longitudinal direction of the first frame 210 at the lower end of the second frame 220. Accordingly, the second frame 220 and the third frame 230 cooperate with each other to form an L-shaped cross section.

As illustrated in FIGS. 3 and 4, the guide groove 300 may be provided at each of opposite sides of the inside of the housing 110. That is, the guide groove 300 may be arranged at a side outer than a coupling space s1 of the housing 110 in which the outer rail 130 is mounted and may be arranged in a direction parallel to the longitudinal direction of the outer rail 130.

The guide groove 300 preferably has space to which an end part of the third frame 230 can be inserted.

Accordingly, when the storage part 120 is rectilinearly reciprocated along the longitudinal direction of the outer rail 130 such that the storage part 120 is withdrawn from the inner space of the housing 110 or is received in the inner space of the housing 110, the storage part 120 can maintain a stable posture without being biased to a side. Furthermore, while a vehicle drives, the storage part 120 can be prevented from shaking in the inner space of the housing 110.

In other words, in a state in which the third frame 230 configured to be inserted to the guide groove 300 is inserted into the guide groove 300, the third frame 230 is fitted to a frame defining the guide groove 300 and is prevented from shaking in a vertical direction or in a horizontal direction. Accordingly, with the storage part 120 maintaining a stable posture without shaking in the width direction of the storage part 120 or leaning to one side, the storage part 120 can move along the outer rail 130.

Meanwhile, as illustrated in FIGS. 1 and 2, a rubber cap 240 may be mounted to the third frame 230 of the shake prevention part 200.

During the movement of the storage part 120, the rubber cap 240 functions to reduce noise occurring due to the contact of the third frame 230 with the frame of the housing 110 defining the guide groove 300, and furthermore, functions to protect the third frame 230 such that the third frame 230 is not deformed or damaged.

Particularly, when the third frame 230 is inserted into the guide groove 300, the rubber cap 240 prevents the occurrence of a gap between the third frame 230 and the guide groove 300 and functions to further prevent the shaking of the third frame 230. Accordingly, with the storage part 120 maintaining a more stable posture, the storage part 120 can move along the longitudinal direction of the outer rail 130.

Meanwhile, a removal prevention protrusion 241 may be provided on the rubber cap 240.

The removal prevention protrusion 241 is formed on the outer surface of the rubber cap 240 by protruding by a predetermined height therefrom and may be in contact with the frame of the housing 110 defining the guide groove 300.

The removal prevention protrusion 241 functions to prevent the unintentional movement of the third frame 230 of the shake prevention part 200 in the guide groove 300. That is, when the third frame 230 is slid in the guide groove 300 by a user pulling or pushing the storage part 120, the removal prevention protrusion 241 functions to prevent the storage part 120 from being moved more than necessary.

In addition, as illustrated in FIG. 3, the shake prevention structure 100 of a glove box according to the embodiment of the present disclosure may further include the support part 150 provided in the housing 110 and supporting the bottom surface of the storage part 120.

The support part 150 may include: a pair of support frames 151 arranged in horizontal directions intersecting longitudinal directions of the coupling frames 111 provided in the housing 110 and connected to the coupling frames 111, the support frames being provided by being spaced apart from each other and in surface contract with the bottom surface of the storage part 120; and rollers 152 provided rotatably between the pair of support frames 151 and in rolling contact with the bottom surface of the storage part 120.

The pair of support frames 151 may be arranged between the pair of coupling frames 111, and the opposite ends of each of the support frames 151 in a longitudinal direction thereof may be connected to the pair of coupling frames 111, respectively. For reference, each of the coupling frames 111 may be considered as a component coupled to the outer rail 130. The coupling frame 111 may be provided as a pair of coupling frames located at the inner bottom part of the housing 110 by being spaced apart from each other.

The rollers 152 are in rolling contact with the bottom surface of the storage part 120 such that the storage part 120 is easily moved and, together with the support frames 151, function to support the bottom surface of the storage part 120.

In other words, when the storage part 120 moves to be opened or closed, the rollers 152 are in rolling contact with the bottom surface of the storage part 120 such that the storage part 120 is easily moved. Furthermore, when the storage part 120 stops, the rollers 152, together with the pair of support frames 151 for supporting the storage part 120, may support the bottom surface of the storage part 120.

The support part 150 configured as described above is located at the second side portion of the housing 110 in the longitudinal direction thereof and functions to support the second-side bottom surface or first-side bottom surface of the storage part 120 in the longitudinal direction thereof.

That is, when the storage part 120 is withdrawn from the inner space of the housing 110, the support part 150 may support the first-side bottom surface of the storage part 120 in the longitudinal direction thereof. Contrarily, when the storage part 120 is received in the inner space of the housing 110, the support part 150 may support the second-side bottom surface of the storage part in the longitudinal direction thereof.

Accordingly, the support part 150 having the above configuration can further prevent the storage part 120 from shaking in the width direction thereof while a vehicle drives, and particularly, can more stably support the weight of goods.

For reference, only the first-side bottom surface of the storage part 120 in the longitudinal direction thereof is connected to the inner rail 140, so as illustrated in FIG. 1, a portion of the second side of the storage part 120 exposed to the outside of the housing 110 is not supported by a separate member. Accordingly, pressure due to the weight of goods is intensively transmitted only to the first-side bottom surface of the storage part 120 relatively not exposed to the outside of the housing 110. That is, pressure due to the weight of goods is intensively transmitted to the first-side bottom surface of the storage part 120 connected to the inner rail 140.

Accordingly, the support part 150 functions to support the second-side bottom surface of the storage part 120 not connected to the inner rail 140 such that the first-side bottom surface of the storage part 120 in the longitudinal direction thereof withstands pressure due to the weight of goods.

Accordingly, when the storage part 120 is rectilinearly moved along the longitudinal direction of the outer rail 130 or when a vehicle drives, the support part 150 functions to prevent the shaking of the storage part 120 and at the same time, functions to prevent the first-side bottom surface of the storage part 120 from being deformed or damaged due to the weight of goods.

Meanwhile, as illustrated in FIGS. 5 to 7, the shake prevention structure 100 of a glove box according to the embodiment of the present disclosure may further include a guide part preventing the horizontal shaking of the storage part 120 in cooperation with the shake prevention part 200 during the movement of the storage part 120 in the housing 110.

The guide part may include the longitudinal protrusion 250 and the slot 260.

As illustrated in FIG. 6, the longitudinal protrusion 250 may be formed on a bottom surface of the storage part 120. In this case, the longitudinal protrusion 250 is preferably provided at a first-side bottom surface of the storage part 120 in the longitudinal direction thereof. It is intended to prevent the knees of a user sitting on a passenger seat from hitting the longitudinal protrusion 250 due to the exposure of the longitudinal protrusion 250 to the outside when the storage part 120 is withdrawn from the housing 110 as illustrated in FIG. 7.

In addition, as illustrated in FIG. 6, the longitudinal protrusion 250 may be formed at the bottom surface of the storage part 120 in parallel to the longitudinal direction of the storage part 120, and may be provided as multiple longitudinal protrusions. For reference, in the embodiment of the present disclosure, a pair of longitudinal protrusions 250 is illustrated to be formed at the bottom surface of the storage part 120 by being spaced apart from each other.

Furthermore, the pair of longitudinal protrusions 250 is preferably provided at the bottom surface of the storage part 120 such that the longitudinal protrusions 250 do not interfere with the inner rails 140 described above.

The longitudinal protrusion 250 having the above configuration may be inserted to the slot 260 formed in the support part 150 when the storage part 120 is withdrawn from the inner space of the housing 110 or is inserted to the inner space of the housing 110.

As illustrated in FIG. 5, the slot 260 may be formed in each of the pair of support frames 151 constituting the support part 150. Accordingly, the slot 260 may be provided as a pair of slots formed at the support frames 151 of the support part 150 by being spaced apart from each other such that the slots correspond to the pair of longitudinal protrusions 250, respectively. Here, the slot 260 is preferably formed such that the slot 260 does not interfere with the roller 152 of the support part 150.

That is, with a distance between the pair of longitudinal protrusions 250 being shorter than a distance between the pair of the inner rails 140, the pair of longitudinal protrusions 250 are formed at the bottom portion of the storage part 120. Likewise, with the distance between the pair of longitudinal protrusions 250 being shorter than a distance between the pair of rollers 152, the pair of longitudinal protrusions 250 may be considered to be provided at the bottom portion of the storage part 120.

Accordingly, during the movement of the storage part 120, the pair of longitudinal protrusions 250 can be inserted to the slots 260, respectively, without interfering with the inner rails 140 and the rollers 152.

As described above, due to the insertion of the longitudinal protrusion 250 to the slot 260, the storage part 120 can be further prevented from shaking in a horizontal direction. Particularly, the slot 260 is formed in each of the pair of support frames 151 of the support part 150, whereby the support part 150 supports the bottom portion of the storage part 120 and at the same time, functions to prevent the storage part 120 from shaking in a horizontal direction during the movement of the storage part 120.

Accordingly, due to the above configuration of the storage part 120, the shaking of the storage part 120 in the horizontal direction can be further prevented.

Although the specific embodiments according to the present invention have been described so far, various modifications are possible without departing from the scope of the present disclosure.

Therefore, the scope of the present disclosure should not be defined by being limited to the embodiments described above, but should be defined not only by the scope of the claims to be described later, but also by equivalents to the scope of the claims.

What is claimed is:

1. A shake prevention structure of a glove box, the glove box comprising a housing mounted to an instrument panel and a storage part provided in an inner space of the housing so as to be slidably withdrawn therefrom, the structure comprising:
   a shake prevention part mounted to a rear portion of the storage part,
   a guide groove allowing an end part of the shake prevention part in a longitudinal direction thereof to be inserted thereto and provided along a longitudinal direction of the housing;
   a first frame coupled to a rear surface of the storage part;
   a second frame connected integrally with the first frame and coupled to a portion of a side surface of the storage part by bending at each of opposite ends of the first frame in a longitudinal direction thereof; and a third frame connected integrally with the second frame and protruding from a lower end of the second frame such that the third frame is inserted into the guide groove.

2. The structure of claim 1, wherein a rubber cap is mounted to the third frame, and
a removal prevention protrusion is formed on an outer surface of the rubber cap.

3. The structure of claim 2, further comprising:
a pair of outer rails arranged under the storage part; and inner rails having lengths shorter than lengths of the outer rails, the inner rails being provided to move along the outer rails, respectively, and connected to a first-side bottom surface of the storage part in a longitudinal direction thereof.

4. The structure of claim 3, further comprising:
a support part provided in the housing and supporting a bottom surface of the storage part, wherein the support part comprises:
a pair of support frames arranged in horizontal directions intersecting longitudinal directions of coupling frames of the housing in which each of the outer rails is seated and connected to the coupling frames, the support frames being provided by being spaced apart from each other and in surface contact with the bottom surface of the storage part; and
rollers provided rotatably between the pair of support frames and in rolling contact with the bottom surface of the storage part.

* * * * *